May 8, 1956   J. S. SENEY   2,744,408
APPARATUS FOR CONTINUOUSLY DETERMINING MASS PER UNIT LENGTH
Filed Oct. 25, 1950   2 Sheets-Sheet 1
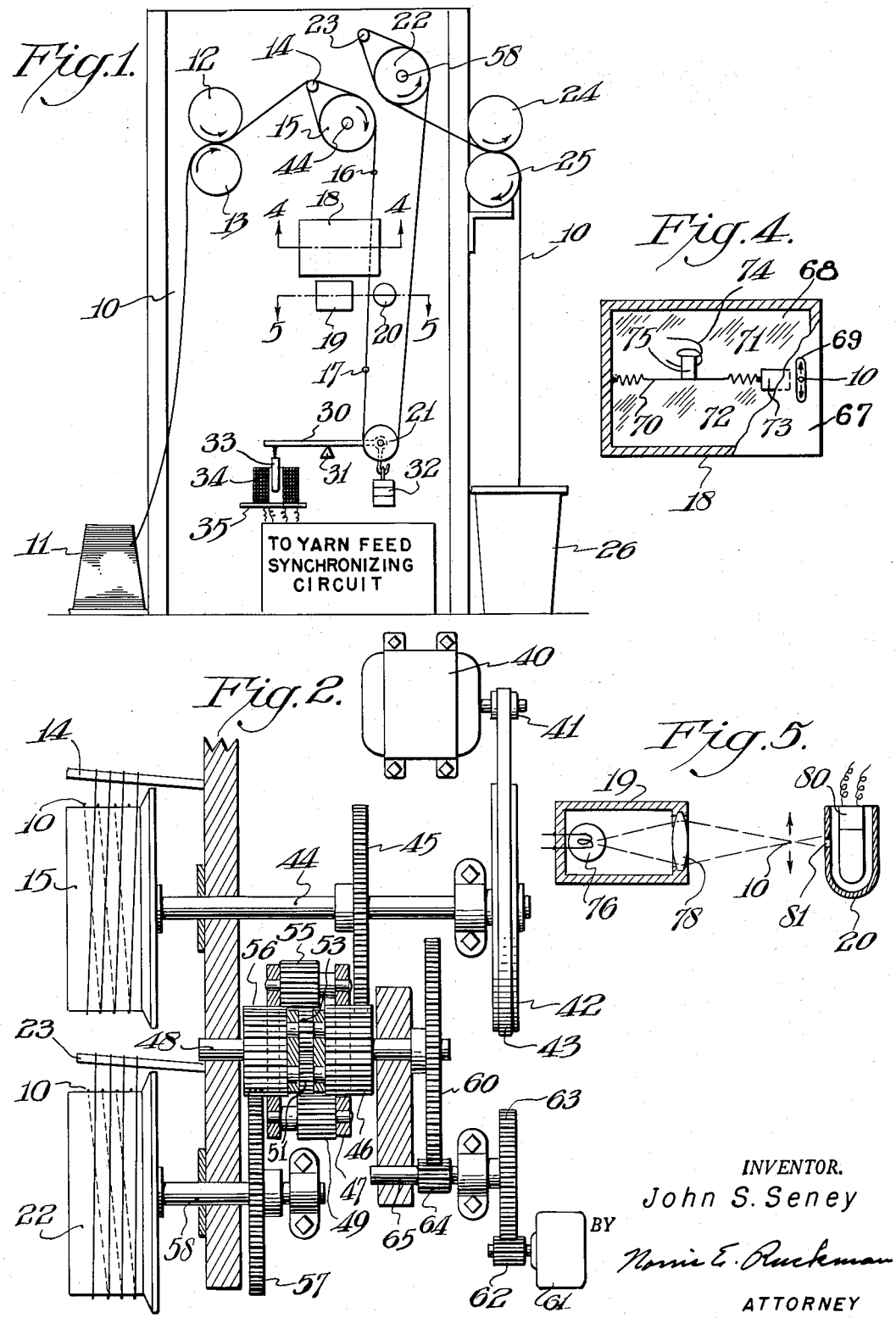
INVENTOR.
John S. Seney
BY
ATTORNEY May 8, 1956 J. S. SENEY 2,744,408
APPARATUS FOR CONTINUOUSLY DETERMINING MASS PER UNIT LENGTH
Filed Oct. 25, 1950 2 Sheets-Sheet 2
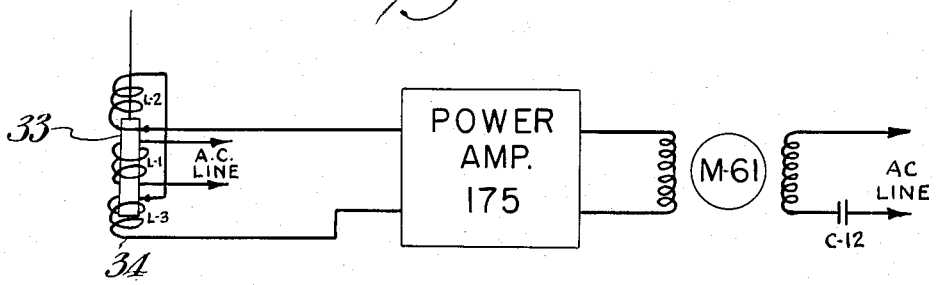
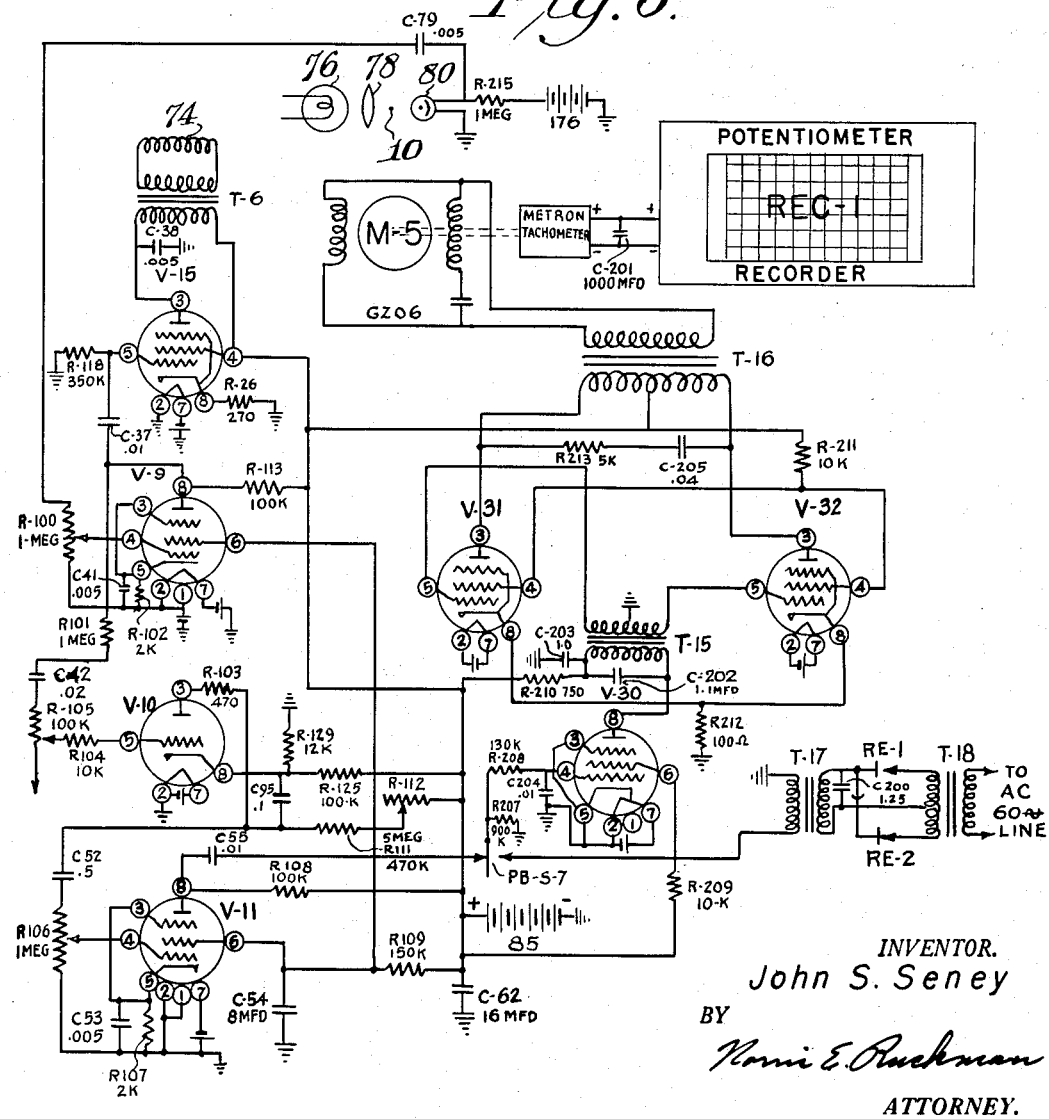
INVENTOR.
John S. Seney
BY
ATTORNEY.

— # United States Patent Office 2,744,408
Patented May 8, 1956

2,744,408

APPARATUS FOR CONTINUOUSLY DETERMINING MASS PER UNIT LENGTH

John S. Seney, Henrico County, Va., assignor to E. I. du Pont de Nemours and Company, Wilmington, Del., a corporation of Delaware Application October 25, 1950, Serial No. 191,973

5 Claims. (Cl. 73—67)

This invention relates to determination of the mass per unit length of elongated structures, and is more particularly concerned with an instrument for continuously measuring and recording denier along a moving yarn.

For control or testing purposes it is frequently desirable to determine the size of yarn, wire or similar elongated srtuctures continuously along the length. In the case of continuous filament synthetic yarns, the size is commonly expressed in terms of denier, a mass per unit length term defined as the weight in milligrams of 9 meters of yarn. The usual method of determining denier is to weigh the length of yarn in question. The method is tedious and is accurate only when long lengths of yarn are weighed.

It is an object of the present invention to provide an instrument by means of which the mass per unit length of short increments of yarn, wire or the like, is determined quickly and with extreme accuracy. A further object of the invention is to provide such an instrument which will automatically determine the mass per unit length of small increments of length along continuously moving yarns, wire or the like and will automatically record the result of the determinations. Other objects of the invention will become apparent from the following description and claims and the accompanying drawings.

The objects of the invention are accomplished by providing means for supporting a yarn, wire or the like under controlled tension between two supports spaced a fixed distance apart, causing the yarn to vibrate at its natural frequency between the two supports, measuring the frequency of vibration of the yarn and determining the mass per unit length, or denier, from the measured frequency. This permits determination of the mass per unit length or denier of stationary yarn, but is especially valuable for determining the denier of yarn moving rapidly, at speeds up to several feet per second, and automatically recording the denier continuously.

The mass per unit length is determined from the measured natural frequency of vibration by means of the following relationship between the frequency, N, the distance between supports, L, the tension, T, and the mass per unit length of the yarn, M:

$$N = \tfrac{1}{2} L \sqrt{T/M}$$

For constant conditions of L and T, the frequency is inversely proportional to the square root of the mass per unit length, and a calibration may be prepared for converting measured frequencies into mass per unit length or denier.

In accordance with the present invention a completely automatic instrument as indicated above, is provided, which comprises two supports spaced a fixed distance apart, feeding means for advancing yarn or the like over the supports at a controlled speed, tension control means for maintaining the yarn under constant tension as the yarn passes between the supports, yarn vibrating means for maintaining the yarn in vibration at its natural frequency as it passes between the supports, a frequency pick-up circuit responsive to vibrations of the yarn for generating an oscillating voltage of the same frequency as the vibrations, an electronic amplifier circuit to further amplify and change the wave form of the oscillating voltage which drives a synchronous A. C. motor whose speed is directly proportional to said yarn frequency. Connected to this motor is a tachometer whose output direct current voltage is proportional to said yarn frequency. This D. C. voltage is recorded on a moving chart by a high speed electronic potentiometer calibrated to read directly in denier of the yarn.

The invention will now be illustrated with reference to the accompanying drawings wherein:

Fig. 1 is a diagrammatic front elevation of the yarn feeding and tensioning portion of one form of the apparatus;

Fig. 2 is a corresponding plan view, showing the drive mechanism for the yarn feeding mechanism;

Fig. 3 is a schematic wiring diagram of one form of synchronizing control for the yarn feed drive mechanism;

Fig. 4 is an enlarged section on the line 4—4 of Fig. 1, showing one form of yarn vibrating device;

Fig. 5 is an enlarged view partly in section on the line 5—5 of Fig. 1, showing one form of device for translating yarn vibrations into an oscillating voltage; and Fig. 6 is a schematic wiring diagram of one form of photoelectric system for maintaining the yarn in vibration at its natural frequency and for determining that frequency of vibration.

Referring to Fig. 1, a yarn 10 is led from a cone 11 between a pair of pretension rolls 12 and 13 which pinch the yarn between them and provide a braking action on the yarn. One of the rolls for instance 13 should be of a resilient material to provide a better grip on the yarn. The yarn passes over a guide roller 14 to a feed wheel 15 which is driven to provide the desired speed of yarn travel. The yarn is wrapped several times around the feed wheel and the guide roller to minimize slippage. The guide roller is adjusted at an askew angle relative to the feed wheel to advance the yarn across the face of the wheel so that turns will not interfere.

From feed wheel 15 the yarn passes downward, contacting lightly two supports or frets 16 and 17, spaced a fixed distance apart. The yarn is caused to vibrate at its natural frequency as it passes between these supports by suitable means, indicated by box 18. It has been shown that the natural frequency of vibration will be inversely proportional to the length of yarn, so the supports are arranged at a distance which will give a convenient frequency for measurement. About 14 inches has been found to be generally suitable. The frequency is measured by various methods, one of which will be described subsequently. It involves the use of a light source, indicated at 19, which is focused on a photoelectric cell 20 located on the opposite side of the vibrating yarn so that movement of the yarn will cause the light to fluctuate and induce a fluctuating voltage in the cell circuit.

The yarn continues downward from support 17 to a tension control roller 21, changes direction around the roller and passes upward to a feed wheel 22. The yarn is wrapped several times around the wheel and an askew guide roller 23, then passes to a pair of output rolls 24 and 25 which grip the yarn between them and keep it under sufficient tension to minimize slippage on wheel 22. The yarn is collected in any convenient manner such as in a receptacle 26.

It has been shown that the frequency of vibration of the yarn will be directly proportional to the square root of the tension, so the tension must be kept constant at a convenient value. This is accomplished by mounting the tension control roller 21 on a balance arm 30 which is pivoted at point 31. The tension of the yarn is then regulated by hanging suitable weights 32 on the balance arm beneath the roller. A weight to produce .2 gram per denier is satisfactory for ordinary measurements.

This balance arm is also used to synchronize the speeds of the two feed wheels. At the opposite end of the arm from the roller 21 is suspended a movable core 33 of a differential transformer 34. The transformer is supported in a fixed position by bracket 35. The position of the core in the transformer is determined by the position of roller 21, which is in turn determined by the relative speeds of the feed wheels. When feed wheel 15 is running faster than wheel 22, roller 21 will be lowered and core 33 will be lifted from its neutral position in the transformer. This causes a change in the voltage of the transformer secondary which is used to control a servo motor arranged to adjust the relative speed of feed wheel 22.

Fig. 2 illustrates one form of drive mechanism for the feed wheels. Power is supplied by an electric motor 40, which may be a variable speed motor with the usual speed control, for adjusting the yarn speed as desired. Motor pulley 41 drives pulley 42 by means of endless belt 43. Pulley 42 is mounted on shaft 44 and drives feed wheel 15 on the other end of the shaft. Also mounted on shaft 44 is a gear 45 which engages gear 46 of a differential 47 mounted on shaft 48. The power is transmitted through the differential by the gear train 46, 49, 51, 53, 55 and 56. Gear 56, corresponding to gear 46, engages a gear 57, corresponding to gear 45, which is mounted on and drives shaft 58 bearing feed wheel 22.

The purpose of this complicated gear train in the power transmission to feed wheel 22 is to make it possible to vary the speed of feed wheel 22 relative to feed wheel 15, so that feed wheel 22 can be driven enough faster to make up for slippage or stretching of the yarn. Also mounted on shaft 48 is a gear 60. When this gear is rotated in the same direction as gear 56, thereby rotating the differential 47, the planetary action of gears 49 and 55 causes gear 56 to be driven at a greater speed than gear 46. Gear 60 is driven by a small servomotor 61 through gear 62 on the motor shaft and gears 63 and 64 mounted on shaft 65. These gears are provided to adapt the speed and torque of the motor to the requirements of the system.

The servomotor 61 is a small two-phase 60 cycle A. C. motor. The speed and direction of the motor can be controlled in various ways, a convenient way being to supply ½ its power from an electronic amplifier circuit as shown in Fig. 3. The center winding L1 of the differential transformer 34 is connected to the A. C. 60 cycle line. If the core 33 is in the exact center position, like voltages will be induced in coils L2 and L3, since these coils are connected to oppose each other 180° out of phase. No voltage will flow to the input of the amplifier 175. Now if the core is lowered so that more voltage is induced in L3, a differential voltage will result in the leads to the amplifier of the phase of L3. If the core is raised a like amount in the other direction, a resultant voltage 180° out of phase with the first voltage will appear at the amplifier.

The amplifier 175 amplifies this voltage sufficiently to energize one phase of servomotor 61. The other phase is energized from the 60 cycle line through capacitor C12 which shifts the electrical phase approximately 90° in this winding, thus causing a rotating field in the motor's rotor when current is furnished by the amplifier. With no signal at the amplifier input, there is no voltage at the output; hence the motor will not run since this motor will not run on one phase only. From this it can be seen that the phase of the voltage to the motor from the amplifier can be shifted 180° by the position of core 33 in transformer 34.

This of course results in full control of motor 61 in either direction. If the core 33 is down the motor 61 will run in a direction to reduce the speed of wheel 22 at a rate depending upon the core's displacement. The reverse of this procedure occurs when the core is in the upper position, and with the core 33 at center the motor 61 stops. Thus lowering or raising the core regulates the operation of motor 61 and, through it, the speed of feed wheel 22 relative to feed wheel 15.

Referring again to Fig. 1, pretension rolls 12 and 13 are rotated by the yarn 10 passing between them. In order to apply tension to the yarn, so that it will not slip appreciably on the feed wheels, one or both of the rolls should be provided with a braking device. A suitable device is a magnetic flux drag. The roll 13 is hollow and a magnetic rotor is caused to rotate inside the roll, counter to the direction of rotation of the roll, by suitable means. By adjusting the current supplied to the magnetic rotor, the magnetic flux drag can be varied to create a desired amount of tension on the yarn. Output rolls 24 and 25, which apply tension to the yarn as it leaves the feed rolls, may be of similar construction. In this case, a magnetic rotor located inside of roll 25 is caused to rotate in the same direction as the roll, but at a greater speed. By adjusting the magnetic flux drag, the roll can be caused to apply the required amount of tension on the yarn to minimize slippage on feed wheel 22.

The mechanism described thus far will feed a yarn or the like through the instrument under uniform tension. While the automatic mechanism disclosed is highly desirable for the purpose, various alternative means will readily occur to one skilled in the art. For example, the electronic speed and tension controls could be replaced with automatic mechanical or even manual controls. Also, it is sometimes desirable to measure a stationary yarn or the like, in which case the above yarn advancing mechanism is not needed.

The yarn supported between the two supports or frets 16 and 17, Fig. 1, may be caused to vibrate at its natural frequency by any suitable means and the resulting vibrations may also be translated into electrical oscillations for recording in various ways. The yarn might be caused to vibrate by plucking it and the vibrations might be picked up with a microphone. However, for automatic operations on a moving yarn, the means about to be described are preferred for measurements of high sensitivity.

In Fig. 4, the yarn 10 is shown travelling through box or housing 18, perpendicular to the plane of the paper and at the extreme right-hand side of the box, whose bottom 67 and top 68 walls are slitted to permit the vibrating yarn to pass through without contacting the box itself. Slit 69 appears in a portion of the bottom wall shown in place in this otherwise sectional view. Arrows in the slit show the direction and suggest the extent of yarn vibration. A rectangular diaphragm 70 divides the box into two chambers 71 and 72, which are connected only through the passageway occupied by the yarn. One side of the diaphragm is attached to a post 73, which extends through the box parallel to and close beside the yarn. The other sides of the diaphragm are attached to the end and sides of the box to complete the partitioning of the box into the two chambers. These chambers are shown as being of approximately the same size, but this is not essential. A solenoid 74 is mounted in chamber 71 opposite to the center of the diaphragm, and a permanent magnet 75 in the solenoid is attached to the center of the diaphragm.

With this arrangement, electrical changes in the solenoid will cause the diaphragm to respond with movement. Movement of the diaphragm toward the solenoid will compress the air in chamber 71 and will decompress the air in chamber 72. A flow of air from chamber 71 to chamber 72 through the yarn passageway will result, which will cause the yarn to be moved toward chamber 72 from its neutral straight line path. Reversal of the direction of movement of the diaphragm will produce a flow of air in the opposite direction and will cause the yarn to be moved toward chamber 71. Hence, looking at the yarn as shown in Fig. 1, the midpoint of the yarn may be caused to move toward or away from the observer by excitation of the solenoid.

Now if means are provided to excite the solenoid in synchronization with the natural frequency of vibration of the yarn, the yarn may be kept in vibration at a suitable amplitude for measurement. Such means are provided by a photoelectrical optical system, shown in Fig. 5, and its electrical circuit, shown in Fig. 6. The optical system comprises an electric lamp 76 enclosed in a box 19 provided with a lens 78 at one end which focuses the light from the lamp on a photoelectric cell 80 through a small aperture 81 in cell housing 20. The aperture is of such dimensions and so positioned that the yarn 10, shown in neutral position travelling perpendicular to the plane of the paper, will block at least a considerable proportion of the light from reaching the photo cell. Movement of the yarn from its neutral position in either direction at right angles to the path of the light rays will permit a greater amount of light to reach the photo cell.

Referring to the wiring diagram shown in Fig. 6, which also indicates suitable values for the various resistances and condensers shown, the output from one side of the photo cell unit 80 is taken through condenser C–79, through gain potentiometer R–100, the other side of which is grounded, and is fed through the variable slider to grid pin 4 of amplifier tube V–9. The output from plate pin 8 of tube V–9 is taken through condenser C–37 to grid pin 5 of power amplifier tube V–15, R–118 being used as a grid leak. The output from the plate of tube V–15 is taken to the primary of output transformer T–6, condenser C–38 being used to prevent sporadic oscillations of V–15. The transformer secondary is connected to diaphragm solenoid 74. The other side of the transformer primary is connected to the screen grid pin 4 of tube V–15 and to the positive terminal of a suitable voltage source 85. The remaining photo cell lead is connected to ground. The cathode of tube V–9 goes to ground through resistance R–102 and condenser C–41, arranged in parallel. The cathode of tube V–15 is grounded through resistance R–26.

By means of permanent magnet 75 (Fig. 4), the diaphragm 70 has a sense of direction as to the polarity of the voltage applied to solenoid 74. For purposes of explanation, it will be assumed that when the yarn is in its neutral position the voltage reaching the solenoid 74 is negative, and that when the yarn moves to one side, admitting more light to the photo cell. The voltage at the solenoid is positive in character. With the yarn in neutral position the negative voltage at the solenoid will cause the diaphragm to move forward and the resulting movement of air will move the yarn backward. The light thereby admitted to the photo cell will reverse the polarity of the solenoid voltage and cause the diaphragm to move back into position to be reactivated when the yarn again reaches its neutral position. The yarn is thereby kept in continuous vibration at its natural frequency.

The electrical oscillations in the above circuit have the same frequency as the natural frequency of vibration of the yarn and are used to determine that frequency. A voltage is taken from plate pin 8 of tube V–9 through resistance R–101, condenser C–42, synchonizing potentiometer R–105, the other side of which is grounded, and is fed through the variable slider and resistance R–104 to grid pin 5 of relaxation oscillator tube V–10. This oscillator tube is used to obtain a uniform saw-tooth wave form which is regulated by and synchronized with the voltage frequency from tube V–9.

The resulting uniform wave form is taken from plate pin 3 of thyratron tube V–10 through resistance R–103 and condenser C–52 to gain potentiometer R–106, the other side of which is grounded, and is fed through the variable slider to grid 4 of amplifier tube V–11. The amplified wave form is taken from plate pin 8 of tube V–11 through condenser C–55 to suitable means for determining the frequency.

The plates of tubes V–9 and V–11 are also connected, through resistances R–113 and R–108, respectively, to the B+ supply source 85. The plate of tube V–10 is similarly connected through resistances R–103, R–111 and R–112 arranged in series. The cathode of tube V–10 is biased by voltage drop across R–129 and ground, this voltage being furnished from the positive terminal of source 85 through R–125. The saw-tooth discharge condenser C–95 is connected across the cathode pin of V–10 to pin 3 in series with R–103. Screen grid voltage is provided to V–9 and V–11 pin 6 through resistor R–109 from positive terminal of power source 85. C–54 and C–62 are used for decoupling. The cathode of tube V–11 is connected to ground through resistance R–107 and condenser C–53 arranged in parallel.

The frequency of the voltage cycles taken from the above circuit can readily be determined by several methods known in the art. A suitable and highly convenient method is to transpose the frequency into a form which can be used to actuate the writing mechanism of a high speed electronic potentiometer recorder so that a continuous record will be made of the frequency of the yarn.

A saw-tooth voltage of the same frequency as the yarn is taken from pin 8 of V–11 through coupling condenser C–55 to the normally closed contact of PB S–7 to bleeder resistor R–207 through the buffer resistor R–208 into the integrating capacitor C–204 to the grid pin 4 of tube V–30. The network R–207, R–208, and C–204 removes the steep wave front from the saw-tooth wave and produces a more uniform wave form to the amplifier tube V–30. This amplified voltage is taken from pin 8 of V–30 to the primary of transformer T–15, through this winding through resistor R–210 to the positive terminal of power source 85. Across the primary winding of T–15 is tuning condenser C–202 which tunes this transformer T–15 to produce a sine wave in its secondary at the frequency of approximately 168 C. P. S. This tank circuit is broad enough to cover the frequency range of the yarn being tested. The resistor R–210 and the condenser C–203 tend to improve the wave form. The cathode of V–30 is grounded. The screen voltage for this tube is taken from R–209.

The output from T–15 secondary winding is center tapped and grounded at this point. The other two leads connect the power amplifier tubes V–31 and V–32 in push-pull at pin 5 of each tube. The output of V–31 and V–32 is connected to the outside terminals of the primary of output transformer T–16. The center tap of this winding is connected to the positive terminal of the power source 85. Across this winding is the oscillation suppressor network consisting of resistor R–213 and capacitor C–205.

The cathodes of tubes V–31 and V–32 are connected together and grounded through resistor R–212. The screen voltage is provided to each tube V–31 and V–32 through resistor R–211 to pin 4 of each tube from the positive terminal of the power source 85. The output of transformer T–16 is connected to the windings of the synchronous motor M–5, one winding of which is connected across the secondary of T–16, the other winding being connected in series with capacitor C–206 to the other side of the secondary winding of T–16. The rotor of the synchronous motor M–5 is mechanically connected to a "Metron" low inertia tachometer generator whose output direct current voltage is directly proportional to its speed. This voltage is filtered by the condenser C–201 which is connected in parallel with the tachometer. This direct current voltage is recorded on a strip chart high speed electronic recording potentiometer—REC–1 which is calibrated in denier units.

The chart is driven by a pair of "Selsyn" devices (not shown), one being attached to the shaft 44 in the drive unit Fig. 2. The other "Selsyn" is attached to the chart paper drive of the recorder REC-1. This is done to synchronize the chart with the yarn being tested.

In order to check the frequency recording system a standard 120 cycles per second is derived from the 60 cycles per second line supply and is substituted for the yarn frequency input at PB S-7 normally open contact, when the check push button PB is pushed. This 120 cycles per second is derived as follows: The transformer T-18 is excited by the 60 C. P. S. line and thus induces a 60 cycles per second voltage into its center tapped secondary winding. Attached to each of the outside leads of this secondary is a half way rectifier RE-1 and RE-2. The cathodes of each of the rectifiers are connected together and form one terminal to the output transformer T-17 primary; the other terminal connects to the center tap of the secondary of T-18. Connected across the primary leads of transformer T-17 is tuning condenser C-200. Upon each cycle of the 60 cycles per second, two positive pulses of voltage will be inserted into the tuned primary of transformer T-17. This results in a 120 cycles per second sine wave voltage in the secondary of T-17.

Although the above embodiment of the invention has been described with reference to determination of yarn denier, it has general utility for determining the mass per unit length of all types of elongated structures, including wires, whenever automatic determination of short increments is to be made quickly and with extreme accuracy.

Since many different embodiments of the invention may be made without departing from the spirit and scope thereof, it is to be understood that the invention is not limited by the specific illustration except to the extent defined in the following claims.

What is claimed is:

1. An apparatus for determining mass per unit length of yarn or the like which comprises two supports spaced a fixed distance apart, yarn feeding means for advancing yarn over said supports under constant tension, a photoelectrical circuit responsive to vibrations of the yarn passing between said supports for transforming said vibrations into electrical oscillations of corresponding frequency, yarn vibrating means responsive to said oscillations for maintaining the yarn in continuous vibration at its natural frequency as it passes between said supports, convertor means for generating a direct current voltage proportional to said frequency, and an electronic potentiometer responsive to said voltage and calibrated to read directly in mass per unit length of the yarn.

2. An apparatus for determining mass per unit length of yarn or the like which comprises two supports spaced a fixed distance apart, yarn feeding means for advancing yarn over said supports under constant tension, a photoelectrical circuit responsive to vibrations of the yarn passing between said supports for transforming said vibrations into electrical oscillations of corresponding frequency, yarn vibrating means responsive to said oscillations for maintaining the yarn in continuous vibration at its natural frequency as it passes between said supports, convertor means for generating a direct current voltage proportional to said frequency, and an electronic recording potentiometer responsive to said frequency and recording on a chart moving in synchronization with the yarn and calibrated to read directly in mass per unit length of the yarn.

3. An apparatus for determining denier of yarn or the like which comprises two supports spaced a fixed distance apart, a plurality of yarn feeding means for advancing yarn over said supports under tension at a controlled speed, tension control means for maintaining the yarn under constant tension as the yarn passes between said supports, synchronizing means for regulating said feeding means, a photoelectric circuit responsive to vibrations of the yarn passing between said supports for transforming said vibrations into electrical oscillations of corresponding frequency, yarn vibrating means responsive to said oscillations for maintaining the yarn in continuous vibration at its natural frequency, electronic means responsive to said photoelectric circuit and including a synchronous motor rotating at a speed directly proportional to the frequency of said oscillations, a tachometer generator driven by said motor and delivering a voltage directly proportional to the speed of rotation, and an electronic recording potentiometer for recording said voltage on a moving chart calibrated to read directly in denier of the yarn.

4. In an electro-mechanical oscillator adapted to utilize a transversely vibrating elongated structure of known length under constant tension as the primary oscillating element, the improvement comprising a transducer including among its elements an otherwise airtight housing slitted in its opposite walls near one side of the housing and circumjacent the plane of vibration of the elongated structure, a diaphragm positioned perpendicular to the plane of vibration dividing the interior of the housing into two similar chambers airtight except for a passage joining the chambers and admitting all of the plane of vibration intercepted by the housing, and a solenoid having a core affixed perpendicular to the diaphragm to vibrate the diaphragm, whereupon resulting alternating compression and decompression of air in each of the two chambers set up on oscillation of air in the passage sufficient to oscillate such an elongated structure.

5. The apparatus improvement of claim 4 characterized further by means for feeding the vibrating elongated structure through the housing in line with the slitted portions of the opposite walls of the housing and a pair of frets flanking the housing and supporting a known length of elongated structure for vibration therebetween.

References Cited in the file of this patent

UNITED STATES PATENTS

| | | |
|---|---|---|
| 1,635,787 | Hort | July 12, 1927 |
| 2,260,847 | Warren | Oct. 28, 1941 |
| 2,265,011 | Siegel | Dec. 2, 1941 |
| 2,278,510 | Condon | Apr. 7, 1942 |
| 2,406,982 | Zworykin et al. | Sept. 3, 1946 |
| 2,538,444 | De Mars | Jan. 16, 1951 |
| 2,542,638 | Desch | Feb. 20, 1951 |

FOREIGN PATENTS

| | | |
|---|---|---|
| 397,167 | Great Britain | Aug. 14, 1933 |

OTHER REFERENCES

Electrical Engineering, Sept. 1936, pp. 991–996, O. H. Schuck.